United States Patent [19]

Ichihara et al.

[11] Patent Number: 4,632,531
[45] Date of Patent: Dec. 30, 1986

[54] FOCUSING SCREEN

[75] Inventors: Yutaka Ichihara, Yokohama; Nobutaka Magome, Kawasaki; Yutaka Iizuka, Fujisawa; Shuji Kunimatsu; Tomonari Inaba, both of Tokyo, Japan

[73] Assignee: Nippon Kogaku K. K., Tokyo, Japan

[21] Appl. No.: 788,224

[22] Filed: Oct. 16, 1985

[30] Foreign Application Priority Data

Oct. 22, 1984 [JP] Japan ................. 59-221790
Oct. 22, 1984 [JP] Japan ................. 59-221791

[51] Int. Cl.⁴ .............................. G03B 13/20
[52] U.S. Cl. .................................... 354/200
[58] Field of Search ........... 354/155, 161, 199, 188, 354/200, 201, 219, 224, 225; 350/286

[56] References Cited

U.S. PATENT DOCUMENTS

| 3,602,085 | 8/1971 | Wagner | 350/286 X |
| 4,003,637 | 1/1977 | Masuoka | 354/200 X |
| 4,071,292 | 1/1978 | Ise et al. | 354/200 X |
| 4,338,012 | 7/1982 | Matsumura et al. | 354/200 |
| 4,352,547 | 10/1982 | Sasaya | 354/200 |
| 4,519,686 | 5/1985 | Seki et al. | 354/200 |

FOREIGN PATENT DOCUMENTS

| 41027 | 9/1965 | German Democratic Rep. | 354/200 |
| 50228 | 4/1980 | Japan | 354/200 |
| 48210 | 10/1982 | Japan | 354/200 |
| 924757 | 5/1963 | United Kingdom | 354/200 |

OTHER PUBLICATIONS

Japanese Patent Publication No. 9531/1962, published Jul. 27, 1962, "Focusing Screen of Camera", Hideo Ohsawa.
Japanese Patent Publication No. 29123/1964, published Dec. 15, 1964, "Focusing Adjusting Screen", Yoshio Kuramoto.
Japanese Laid Open Patent Appln. No. 626/1979, published Jan. 6, 1979, "Focus Detecting Screen Used Diffraction Grating", Norio Shiotake.

Primary Examiner—Donald A. Griffin
Attorney, Agent, or Firm—Shapiro and Shapiro

[57] ABSTRACT

A focusing screen in a split image coincidence type range finder provided with an objective lens forming an imaging plane comprises a plurality of light diffusing portions each of which has a surface inclined with respect to the imaging plane. A number of minute depressions or projections are formed on the inclined surface. The depressions or projections are arranged in the form of a matrix along a first direction and a second direction intersecting each other and symmetrical with respect to a fixed direction parallel to the inclined surface and the imaging plane. Each of the depressions or projections is of a pyramidic shape having as the base a parallelogram having first and second sides parallel to the first direction and third and fourth sides parallel to the second direction and extended in the fixed direction. Each of the depressions or projections is arranged so that each side of the parallelogram is common to a side of another adjacent parallelogram.

14 Claims, 15 Drawing Figures

FOCUSING SCREEN

BACKGROUND OF THE INVENTION

1. Field of the Invention

This invention relates to a focusing screen disposed on the observation optical path of an optical apparatus such as a camera, and in particular to a focusing screen in a split image type range finder.

2. Description of the Prior Art

A focusing screen having a pair of wedge prisms disposed on the center of the focal plane to enhance the accuracy of focusing has heretofore been used as the focusing screen of a camera. The wedge prisms are of a semicircular shape and disposed so as to deflect light rays in opposite directions, and the two wedge prisms together constitute a circular focus detecting portion. Light rays condensed from an objective lens onto the center of the focusing screen are refracted by the pair of wedge prisms on the central portion of the focusing screen and arrive at an eyepiece along the optic axis. The image of the field of view of the focus detecting portion when the focus is not coincident is separated at the boundary between the two wedge prisms in the direction of the boundary lines. When the focus is coincident, the image is not separated but observed.

However, in such a split image coincidence type focusing screen, there has been a disadvantage that when the stop is stopped down or relative to a dark lens of great F-number, the surfaces of the prism are darkchanged to make focus detection difficult. Enhancing the accuracy of focus detection and preventing a dark change of the surfaces of the prism are in a contrary relation with each other and it is difficult to satisfy the two at a time, and various contrivances to this problem have long been proposed.

As an example, there is disclosed in Japanese Patent Publication No. 9531/1962 a focusing screen in which the surfaces of a split prism are made into fine particulate surfaces and by the scattering of light thereby, the dark change in the case of a small stop is prevented. In this focusing screen, however, during the non-focusing, the image of the split prism portion creates blur similar to the mat surface around it and therefore, focusing is effected with the aid of the blur rather than with the aid of the displacement of the image, and it has been difficult to accomplish focusing of good accuracy intrinsic to the split prism. In this focusing screen, the scattered lights on the surfaces of the split prism have been substantially isotropic and created in all directions and therefore have been almost useless, and the focus detecting portion has become dark and focusing has been difficult to accomplish.

Also, examples of the focusing screen in which a diffraction grating structure is formed on the surface of a split prism are known from Japanese Laid-open Patent Application No. 626/1979 and U.S. Pat. No. 4,338,012. These constructions are considerably excellent as compared with the aforedescribed construction, but due to their diffraction grating structure the lines caused by the darkening of the grooves and valleys of the diffraction grating which extend in a direction perpendicular to the boundary line of the prism become readily conspicuous and an eyesore, and also due to the periodical structure of the diffraction grating, the directions of dispersion of light become separate, and the object image in the case of out-of-focus has become multi-line blurred and has not always been sightly. Also, such constructions have suffered from a problem that if there is a periodical structure in the object image, moiré stripes are created to make the object image more unsightly. Further, there has been a disadvantage that due to the action of the diffraction grating, coloring of the blurred image appears when the stop is slightly stopped down.

Also, constructions in which the focus detecting portion is constructed of only a diffraction grating instead of a split prism and each element of the grating is blazed and a plurality of blaze angles are provided to thereby diffract light in many directions and prevent the phenomenon of dark change are disclosed in Japanese Patent Publication No. 29123/1964 and the aforementioned U.S. Pat. No. 4,338,012. However, these constructions have a nature peculiar to the diffraction grating more strongly than the aforedescribed construction in which a diffraction grating is formed on the surface of the split prism and therefore, in these constructions, the above-noted disadvantages have been emphasized and the disadvantage that in the case of stop-down, remarkable coloring occurs to the blurred image of the object to be photographed has been unavoidable.

SUMMARY OF THE INVENTION

It is an object of the present invention to provide an improved focusing screen which can easily detect the in-focus state.

It is another object of the present invention to provide a split image type focusing screen in which a split prism portion for focus detection is not darkchanged and the focus detecting portion is slightly both during focusing and non-focusing.

It is still another object of the present invention to provide a split image type focusing screen which is provided with a focus detecting portion for making a smooth blurred image and in which the creation of moiré stripes thereon is slight and further, the coloring of the blurred image is also slight.

The focusing screen according to the present invention has a split prism including a pair of wedge prisms having inclined surfaces inclined in opposite directions at a predetermined angle with respect to the focal plane, and a number of minute depressions or projections disposed along a matrix prescribed by symmetrical first and second directions intersecting a fixed direction parallel to said inclined surfaces and said focal plane are formed on each of said inclined surfaces of said wedge prisms. Each of said depressions or projections is of a pyramidic shape having a parallelogram as the base, and said parallelogram is of a shape having two sides parallel to said first direction and two sides parallel to said second direction and extended in said fixed direction. Said number of depressions or projections are arranged closely to one another so that each side of said parallelogram is common to a side of an adjacent parallelogram. By such arrangement of a number of minute depressions or projections, a number of groups of edge lines or valley lines along said first and second directions are formed in a mesh-like form on the inclined surfaces of said wedge prisms.

In an embodiment of the present invention, the intervals between the lines forming these edge lines or valley lines are all made equal to one another and these lines form a substantially two-dimensional diffraction grating.

In another embodiment of the present invention, the intervals between said lines are of two kinds and the lines are non-periodically arranged at random, whereby during non-focusing, a smoother blurred image is obtained and the coloring of the blurred image is prevented.

It is preferable that the angle of inclination θ of each wedge prism forming the split prism with respect to the focal plane be selected in the range of 6°–12°. That is, 6° or more is necessary to maintain the accuracy of range finding sufficiently high and on the other hand, if 12° is exceeded, the focus detecting portion tends to be readily dark-changed relative to a dark lens or when the stop is stopped down and thus, it becomes difficult to obtain the effect of the present invention.

The angles α formed by said first and second direction with respect to said fixed direction are respectively in the range of 5°–20° and accordingly, it is desirable that the angle formed by said two directions with respect to each other be in the range of 10°–40°. When said angles α are smaller than 5°, the stripe-pattern in the field of view of the focus detecting portion still tends to be readily conspicuous, and as the angles α increase, the distribution of the scattering intensity of light rays becomes greater in said fixed direction and thus, the scattering effect in the direction of the dividing line necessary as a split prism is decreased and particularly, when the upper limit 20° is exceeded, the effect of preventing the dark change of the focus detecting portion becomes small. Also, it is desirable that the interval d between the lines constituting the groups of edge lines or the groups of valley lines be in the range of 5–20 μm and that the basic angle β of the pyramid of each depression or projection be in the range of 2°–8°. It is also desirable that the basic angles β of the pyramid be all equal with respect to all of the depressions or projections.

DESCRIPTION OF THE PREFERRED EMBODIMENTS

Figure 1:
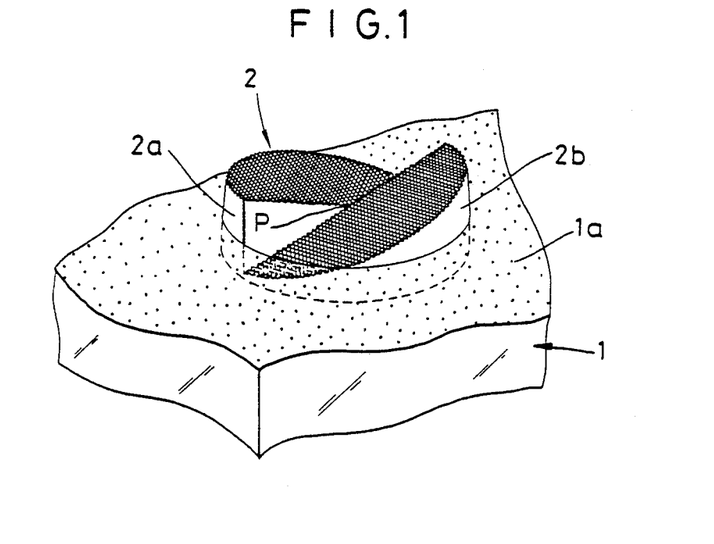
FIG. 1 is a perspective view of the central portion of a focusing screen according to a first embodiment of the present invention which includes a split prism.
Figure 2:
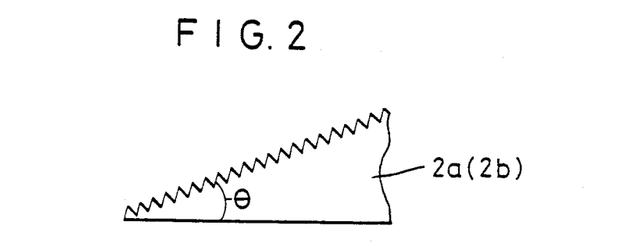
FIG. 2 is a side view of a wedge prism constituting the split prism.

In FIGS. 1 and 2, there is schematically shown the shape of a split prism provided at the center of a focusing screen. One surface $1a$ of the focusing screen 1 is formed into a mat surface, and in the central portion thereof, the is provided a split prism 2 including two wedge prisms $2a$ and $2b$. The two wedge prisms $2a$ and $2b$ are of semicircular shapes having the same prism vertical angle θ and are disposed so that their declimations are opposite to each other, and these are combined to constitute a circular focus detecting portion. The boundary surface of the two wedge prisms $2a$ and $2b$ corresponds to the diameter of the circular focus detecting portion and constitutes a dividing line in the field of view of the focus detecting portion. Also, a point P at which the inclined surfaces of the wedge prisms $2a$ and $2b$ intersect each other is coincident with the focusing surface $1a$ of the focusing screen 1, and the focusing screen 1 is disposed so that the focusing surface $1a$ thereof is coincident with the imaging plane of an objective lens, not shown. Groups of edge lines arranged in two directions are formed on the inclined surface of each wedge prism and have the function of scattering light rays refracted by the wedge prisms.

Figure 3A:
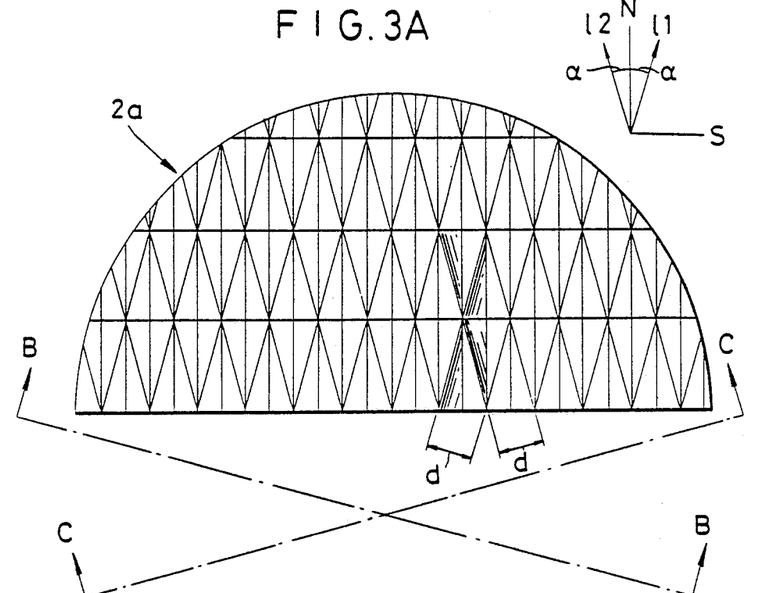
FIG. 3A is a plan view of the wedge prism.
Figure 3B:
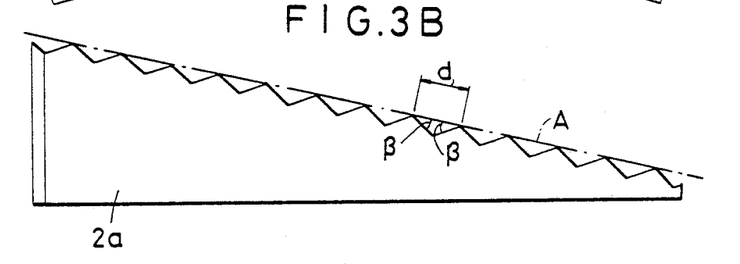
FIGS. 3B and 3C are views taken along line B—B and line C—C, respectively, of FIG. 3A.
Figure 3C:
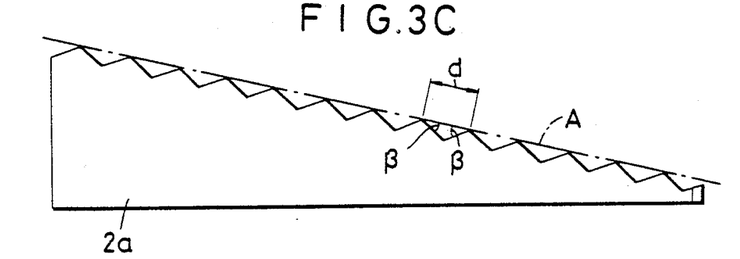

FIG. 3 shows the shape of a number of minute cuttings regularly formed on the inclined surfaces of the wedge prisms of a first embodiment. In FIG. 3A, groups of oblique lines intersecting one another represent the groups of edge lines formed by the cuttings. In FIGS. 3b and 3C, dot-and-dash lines A represent the reference surfaces corresponding to the inclined surfaces of the wedge prisms. A group of edge lines along a first direction $l_1$ and a group of edge lines along a second directions $l_2$ are formed on the inclined surfaces of the wedge prisms $2a$ and $2b$, and the direction of each of the groups of edge lines forms an angle $\alpha = 14°$ with respect to the perpendicular N to the direction S of the dividing line (boundary line) of the two wedge prisms and is symmetrical with respect to this perpendicular N.

Figure 4:
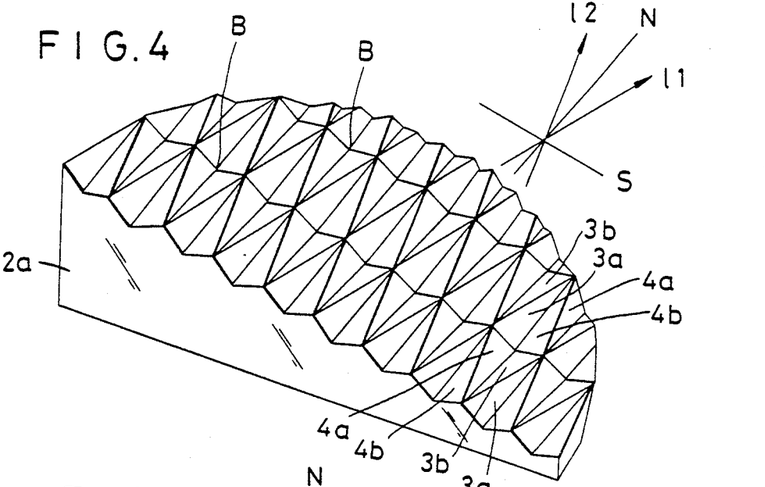
FIG. 4 is a perspective view of the wedge prism of FIG. 3C.

In the first embodiment, the intervals (width) d between the edge lines are all equal and the angles β formed by the inclined lines forming the edge lines with respect to the surfaces of the wedge prisms are all equal. By these minute cuttings, a number of quadrangular pyramidic depressions provided with a bottom B are formed as shown in FIG. 4. Each edge line along the first direction $l_1$ is formed by a first inclined surface $3a$ and a second inclined surface $3b$, and each edge line along the second direction $l_2$ is formed by a third inclined surface $4a$ and a fourth inclined surface $4b$, and each depression has these four inclined surfaces.

It is preferable that the diameter of the split prism 2 be of the order of 3 mm and the interval between the edge lines be 5–20 μm. Accordingly, 150 to 600 edge lines are formed on a wedge prism, and quadrangular pyramidic depressions substantially equal in number thereto are arranged horizontally and 50 to 200 quadrangular pyramidic depressions are arranged vertically.

Figure 5:
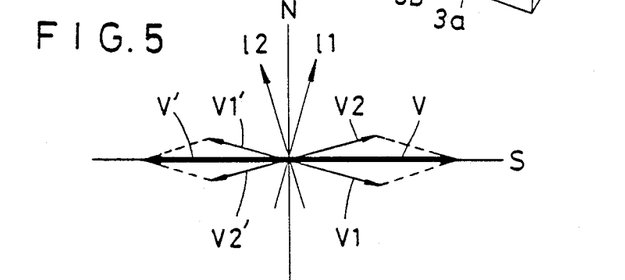
FIG. 5. is a vector diagram showing the state of the scattered light by the focusing screen according to the first embodiment.

Due to the presence of such groups of edge lines in two directions, light beams entering the split prism are first deflected by the wedge prisms, whereafter they are diffracted perpendicularly to the groups of edge lines in two directions by these groups of edge lines. FIG. 5 is a vector diagram illustrating the directions of diffraction of these light beams by the groups of edge lines. The directions of diffraction by the edge lines in the first direction $l_1$ are represented by $V_1$ and $V_1'$ perpendicular thereto, and the directions of diffraction by the edge lines in the second direction $l_2$ are represented by $V_2$ and $V_2'$ perpendicular thereto. Thus, in the direction of the dividing line S of the split prism, the directions of diffraction are represented by the composite vector V of $V_1$ and $V_2$ and the composite vector $V'$ of $V_1'$ and $V_2'$, and during the focus detection, the blurred image by the composite action of the diffracted lights by the groups of prism rows in the direction along the dividing line S is observed.

According to the construction of the first embodiment as described above, in the case of out-of-focus, the object image is clearly separated by the split prism 2 and observed, and due to the diffracting action by the groups of edge lines in two directions formed on the inclined surfaces of the wedge prisms, the focus detecting portion is not dark-changed even in a case where the stop is stopped down or a dark lens is used and moreover, it becomes difficult for an unsightly stripe-pattern to be observed in the focus detecting portion and there can be obtained a clear-cut attractive field of view.

Figure 6:
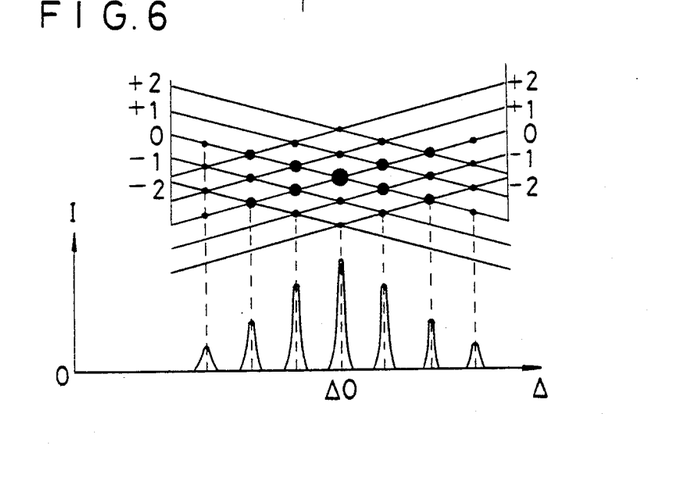
FIG. 6 illustrates the diffraction pattern of the split prism in the first embodiment.

However, in the above-described split prism 2, both of the groups of edge lines in two directions are arranged in a predetermined period and a substantially two-dimensional diffraction grating is formed and therefore, there is still a possibility of having disadvantages such as multiple-line blur by the diffracted light and coloring of a blurred image. Specifically, as shown by the intensity distribution curves of the diffraction pattern and diffracted light of FIG. 6, the diffraction pattern in the split prism 2 is clearly separated for each diffraction order. In the intensity distribution curve of the diffracted light shown in the lower portion of FIG. 6, the ordinate represents the intensity I and the abscissa represents the deflection angle $\Delta$ of the light ray, and $\Delta_0$ is the declination by the wedge prisms, and this angle corresponds to the angle of the O-order light of the diffrated lights by the groups of edge lines.

Figure 7A:
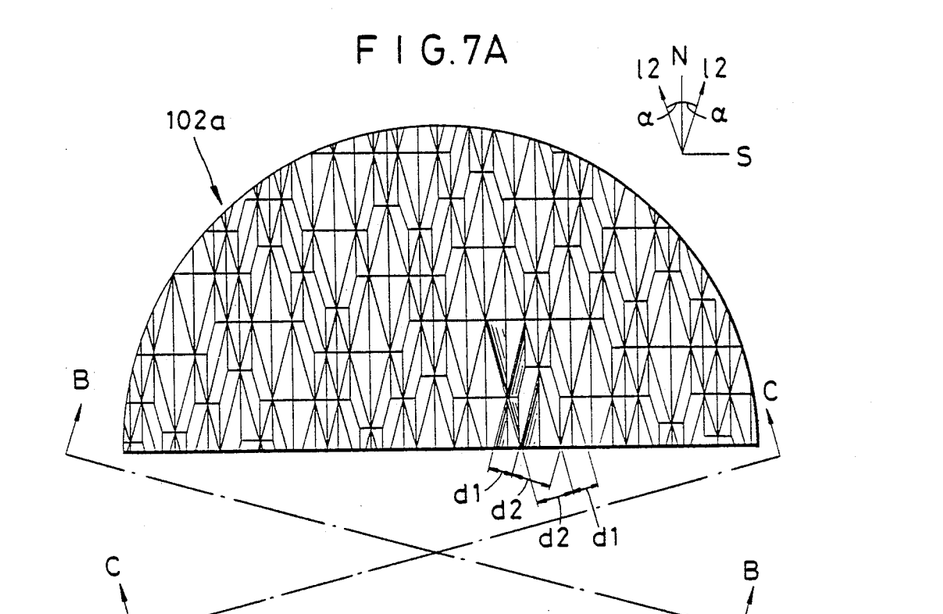
FIG. 7A is a plan view of a wedge prism in a second embodiment.
Figure 7B:
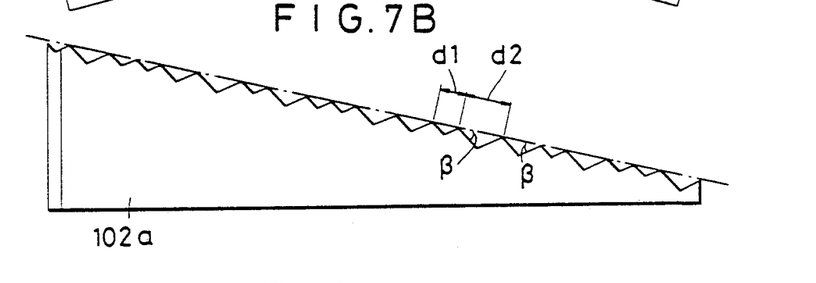
FIGS. 7B and 7C are side views taken along line B—B and line C—C, respectively, of FIG. 7A.
Figure 7C:
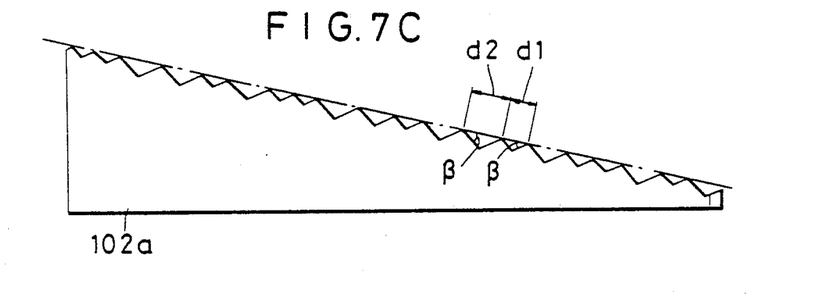

FIG. 7 shows a second embodiment which eliminates the disadvantage peculiar to the above-described first embodiment. In FIG. 7A, the groups of oblique lines intersecting one another represent edge lines as in FIG. 3A. In FIGS. 7B and 7C, letter A designates a surface corresponding to the inclined surface of a wedge prism. Again in the wedge prism 102$a$ according to the second embodiment, a first direction $l_1$ and a second direction $l_2$ are symmetrical with respect to a direction perpendicular to the dividing line S of the split prism and both of them form an angle $\alpha$ with respect to said perpendicular direction. Also, the inclined surfaces forming edge lines all have an equal angle $\beta$ with respect to the inclined surface A of the wedge prism, but there are two kinds of intervals $d_1$ and $d_2$ between the edge lines. The groups of edge lines in the first direction $l_1$ are arranged at random at these two kinds of intervals without having periodicity. Also, the groups of edge lines in the second direction $l_2$ are likewise arranged at random. Accordingly, there are two kinds of depths in the depressions formed between the edge lines and these exist at random. There are four kinds of quadrangular pyramidic depressions formed by the groups of edge lines.

Figure 8:
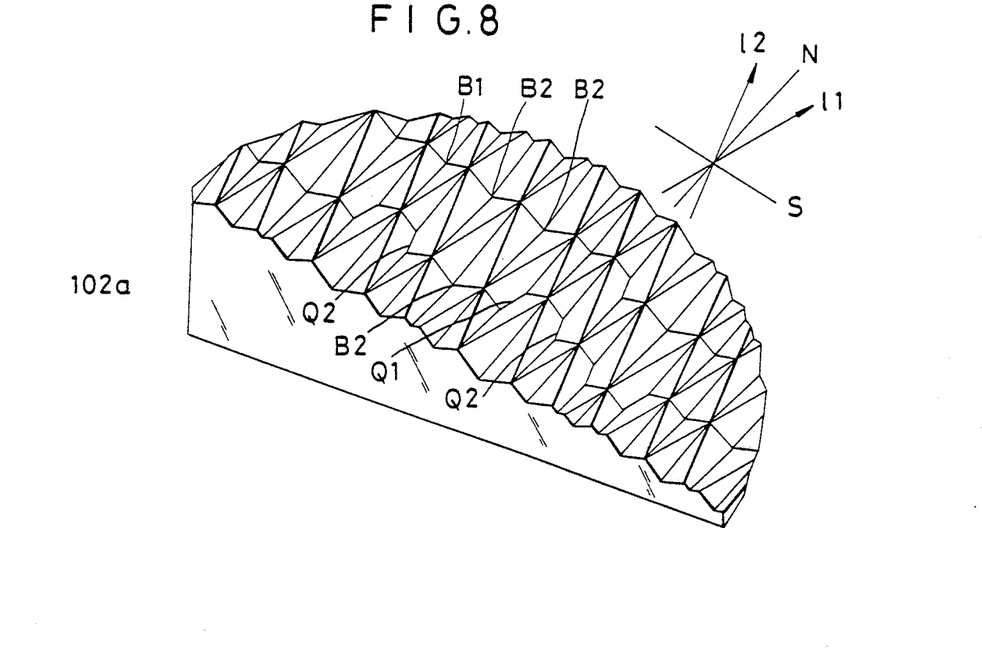
FIG. 8 is a perspective view of the wedge prism in the second embodiment.

That is, the first kind of depression is formed by two edge lines in the first direction arranged at a relatively narrow interval $d_1$ and two edge lines in the second direction arranged also at the narrow interval $d_1$, and has a vertex $B_1$ at its bottom as shown in FIG. 8. The second kind of depression is formed between two edge lines in the first direction arranged at a relatively wide interval $d_2$ and two edge lines in the second direction arranged also at the wide interval $d_2$, and has a vertex $B_2$ at its bottom.

The third kind of depression exists at a position whereat two edge lines in the first direction arranged at the interval $d_2$ intersect two edge lines in the second direction arranged at the interval $d_1$, and has a groove $Q_2$ at its bottom. The fourth kind of depression exists at a position whereat two edge lines in the first direction arranged at the interval $d_1$ intersect two edge lines in the second direction arranged at the interval $d_2$, and has a groove $Q_1$ at its bottom.

Figure 9:
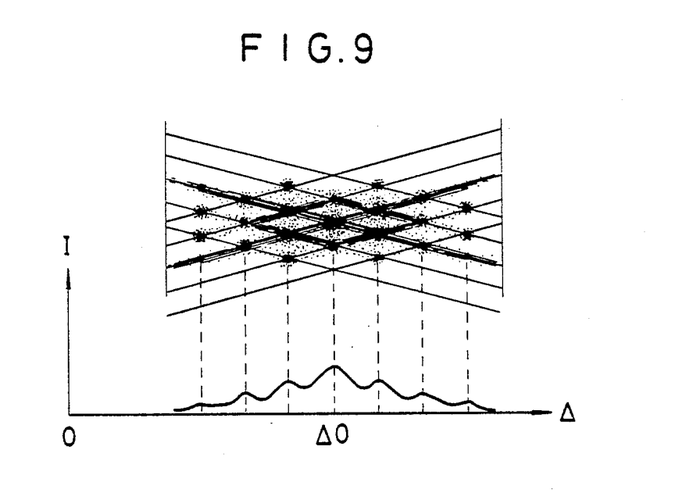
FIG. 9 illustrates the diffusion pattern of the split prism in the second embodiment.

FIG. 9 schematically shows the diffusion pattern and the intensity distribution curve of diffused light in such a focusing screen according to the second embodiment. As shown, the diffusion pattern is substantially symmetrical with the O-order light $\Delta_0$ as the center, but the intensity distribution is one in which the diffraction pattern such as the diffraction grating is substantially extinguished and widely diffused. That is, as in this second embodiment, the groups of the edge lines in each direction are made into groups of edge lines arranged non-periodically at random at different intervals, whereby it is possible to have a distribution of quantity of light widened along the dividing line of the split prism and yet obtain a scattering characteristic approximate to that of a popular diffusing plate.

In this focusing screen, it is preferable that in each group of edge lines, the arrangement of edge lines at the same interval be not continued three or more times and the order of arrangement at two kinds of edge line intervals be determined by a table of random numbers. Thus, the edge lines or the grooves formed thereby can be better prevented from becoming conspicuous as a stripe-pattern in the focus detection field of view.

In the above-described embodiment, the angles $\beta$ formed by the inclined surfaces forming the edge lines with respect to the surface of the wedge prism need not always be equal to one another, but may be several different angles.

Figure 10:
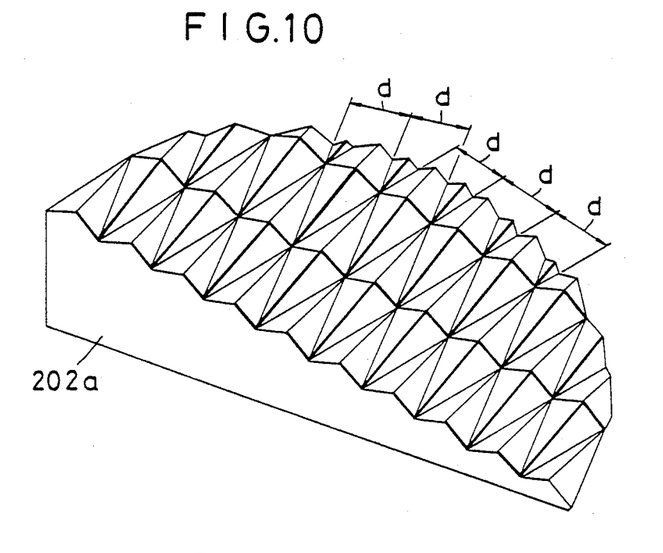
FIG. 10 is a perspective view showing a wedge prism according to a third embodiment.

In a wedge prism 202$a$ shown in FIG. 10, the concavo-convexity of the surface of the split prism 2 of said first embodiment is inverted and a number of minute projections corresponding to a number of minute depressions are formed on the surface. Each of the minute projections of the wedge prism 202$a$ is a quadrangular pyramid having four sides each forming an angle $\beta$ with respect to the inclined surface of the wedge prism, and the base of each quadrangular pyramid forms an angle $\alpha$ with respect to the perpendicular N to the dividing line of the split prism, and the intervals between the bases are all d.

Figure 11:
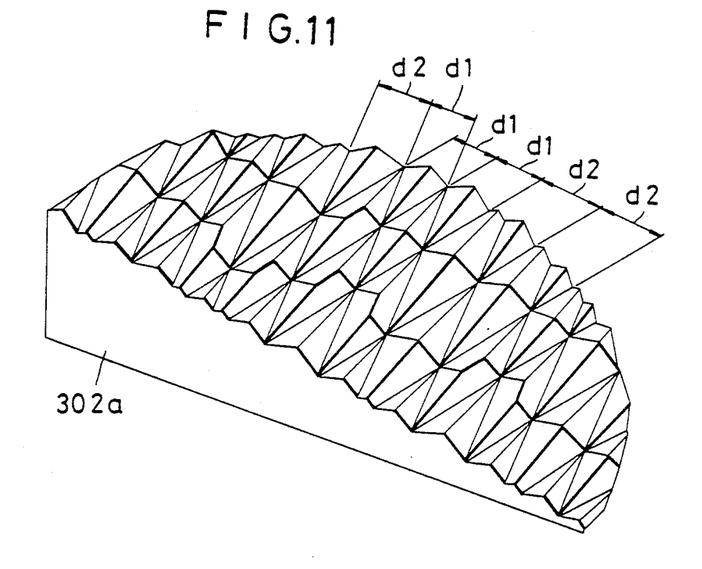
FIG. 11 is a perspective view showing a wedge prism according to a fourth embodiment.

A wedge prism 302$a$ shown in FIG. 11 is one in which the concavo-convexity of the surface of the split prism 102 of said second embodiment is inverted. Accordingly, the shapes of the minute projections on the prism 302$a$ are of four kinds having bases $d_1 \times d_1$, $d_2 \times d_2$, $d_1 \times d_2$ and $d_2 \times d_1$, respectively.

Split prisms provided by the above-described wedge prisms 202$a$ and 302$a$, respectively, have functions similar to those of the split prisms 2 and 102 of the above-described first and second embodiments.

Each of the above-described aplit prisms can not only be constructed of the two semicircular wedge prisms illustrated in FIG. 1, but also can be constructed, for example, by combining four wedge prisms so that the directions of displacement of the blurred images thereby are perpendicular to one another.

We claim:

1. A focusing screen in a split image coincidence type range finder provided with an objective lens forming an imaging plane, comprising a plurality of light diffusing portions each of which has a surface inclined with respect to said imaging plane, a number of minute depressions being formed on said inclined surface, said depressions being arranged in the form of a matrix along a first direction and a second direction intersecting each other and symmetrical with respect to a fixed direction parallel to said inclined surface and said imaging plane, each of said depressions being of a pyramidic shape having as the base a parallelogram having first and second sides parallel to said first direction and third and fourth sides parallel to said second direction and extended in said fixed direction, each of said depressions being arranged so that each side of said parallelogram is common to a side of another adjacent parallelogram.

2. A focusing screen according to claim 1, wherein said number of minute depressions are all formed with the same dimensions.

3. A focusing screen according to claim 2, wherein said first, second, third and fourth sides of said parallelogram prescribing each of said minute depressions have the same dimension.

4. A focusing screen according to claim 1, wherein a number of edge lines along said first direction and said second direction are formed on said inclined surface by said number of minute depressions, said number of edge lines being arranged non-periodically with the intervals therebetween being made different.

5. A focusing screen according to claim 1, wherein the angle between each of said first direction and said second direction and said fixed direction is in the range of 5°–20°.

6. A focusing screen according to claim 1, wherein the interval between the first side and the second side and the interval between the third side and the fourth side of said parallelogram prescribing each of said minute depressions are 5–20 μm.

7. A focusing screen according to claim 1, wherein the basic angle of said pyramid prescribing each of said minute depressions is in the range of 2°–8°.

8. A focusing screen in a split image coincidence type range finder provided with an objective lens forming an imaging plane, comprising a plurality of light diffusing portions each of which has a surface inclined with respect to said imaging plane, a number of minute projections being formed on said inclined surface, said projections being arranged in the form of a matrix along a first direction and a second direction intersecting each other and symmetrical with respect to a fixed direction parallel to said inclined surface and said imaging plane, each of said projections being of a pyramidic shape having as the base a parallelogram having first and second sides parallel to said first direction and third and fourth sides parallel to said second direction and extended in said fixed direction, each of said projections being arranged so that each side of said parallelogram is common to a side of another adjacent parallelogram.

9. A focusing screen according to claim 8, wherein said number of minute projections are all formed with the same dimensions.

10. A focusing screen according to claim 9, wherein said first, second, third and fourth sides of said parallelogram prescribing each of said minute projections have the same dimension.

11. A focusing screen according to claim 8, wherein a number of valley lines along said first direction and said second direction are formed on said inclined surface by said number of minute projections, said number of valley lines being arranged non-periodically with the intervals therebetween being made different.

12. A focusing screen according to claim 8, wherein the angle between each of said first direction and said second direction and said fixed direction is in the range of 5°–20°.

13. A focusing screen according to claim 8, wherein the interval between the first side and the second side and the interval between the third side and the fourth side of said parallelogram prescribing each of said minute projections are 5–20 μm.

14. A focusing screen according to claim 8, wherein the basic angle of said pyramid prescribing each of said minute projections is in the range of 2°–8°.

* * * * *